United States Patent
Han et al.

(10) Patent No.: US 9,824,017 B2
(45) Date of Patent: Nov. 21, 2017

(54) CACHE CONTROL APPARATUS AND METHOD

(71) Applicant: ELECTRONICS AND TELECOMMUNICATIONS RESEARCH INSTITUTE, Daejeon (KR)

(72) Inventors: Jin Ho Han, Seoul (KR); Young Su Kwon, Daejeon (KR); Kyoung Seon Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 146 days.

(21) Appl. No.: 14/253,349

(22) Filed: Apr. 15, 2014

(65) Prior Publication Data

US 2015/0143049 A1  May 21, 2015

(30) Foreign Application Priority Data

Nov. 20, 2013  (KR) .................... 10-2013-0141597

(51) Int. Cl.
*G06F 12/00* (2006.01)
*G06F 12/0875* (2016.01)
*G06F 12/0831* (2016.01)

(52) U.S. Cl.
CPC ...... *G06F 12/0875* (2013.01); *G06F 12/0831* (2013.01); *G06F 12/0833* (2013.01)

(58) Field of Classification Search
CPC ............. G06F 12/0875; G06F 12/0833; G06F 12/0831
See application file for complete search history.

(56) References Cited

U.S. PATENT DOCUMENTS

| 5,729,190 A * | 3/1998 | Iyengar ............... G06F 12/0895 340/146.2 |
| 8,185,695 B2 | 5/2012 | Conway et al. |
| 8,205,046 B2 | 6/2012 | Shaw et al. |
| 2003/0018739 A1 * | 1/2003 | Cypher ............... G06F 12/0831 709/213 |
| 2003/0154350 A1 * | 8/2003 | Edirisooriya ....... G06F 12/0831 711/141 |

(Continued)

OTHER PUBLICATIONS

G.Q. Kenney, Cache Coherency in Multiprocessor Systems, 1999, http://www-5.unipv.it/mferretti/cdol/aca/Charts/MESI/Bremen-MESI.pdf.*

*Primary Examiner* — Kalpit Parikh
(74) *Attorney, Agent, or Firm* — Rabin & Berdo, P.C.

(57) ABSTRACT

Provided is a cache control apparatus and method that, when a plurality of processors read a program from the same memory in a chip, maintain coherency of data and an instruction generated by a cache memory. The cache control apparatus includes a coherency controller client configured to include an MESI register, which is included in an instruction cache, and stores at least one of a modified state, an exclusive state, a shared state, and an invalid state for each line of the instruction cache, and a coherency interface connected to the coherency controller and configured to transmit and receive broadcast address information, read or write information, and hit or miss information of another cache to and from the instruction cache.

18 Claims, 6 Drawing Sheets

(56) References Cited

U.S. PATENT DOCUMENTS

| | | | |
|---|---|---|---|
| 2005/0027945 A1* | 2/2005 | Desai | G06F 12/0822 |
| | | | 711/145 |
| 2007/0186051 A1* | 8/2007 | Harada | G06F 12/0835 |
| | | | 711/141 |
| 2012/0137079 A1 | 5/2012 | Ueda | |
| 2014/0082300 A1* | 3/2014 | Han | G06F 12/0815 |
| | | | 711/141 |

* cited by examiner

FIG. 4

| State | Event | Action | Next Start |
|---|---|---|---|
| Invalid | Read miss, shared (cache copies exist) | Read cache line | Shared |
| | Read miss, Exclusive (no cache copies exist) | Read cache line | Exclusive |
| | Write miss | •Broadcast invalidate<br>•Read cache line<br>•Modify cache line | Modified |
| Shared | Read hit | | Shared |
| | Write hit | Broadcast invalidate | Modified |
| | Snoop hit on read | | Shared |
| | Snoop hit on invalidate | invalidate cache line | Invalid |
| Exclusive | Read hit | | Exclusive |
| | Write hit | | Modified |
| | Snoop hit on read | | Shared |
| | Snoop hit on invalidate | invalidate cache line | Invalid |
| Modified | Read hit | | Modified |
| | Write hit | | Modified |
| | Snoop hit on read | Write cache line back to memmory | Shared |
| | Snoop hit on invalidate | Write cache line back to memmory | Invalid |
| | LRU Replacement | Write cache line back to memmory | Invalid |

CACHE CONTROL APPARATUS AND METHOD

CROSS-REFERENCE TO RELATED APPLICATIONS

This application claims priority under 35 U.S.C. §119 to Korean Patent Application No. 10-2013-0141597, filed on Nov. 20, 2013, the disclosure of which is incorporated herein by reference in its entirety.

TECHNICAL FIELD

The present invention relates to a cache control apparatus and method that, when a plurality of processors read a program from the same memory in a chip, maintain coherency of data and an instruction generated by a cache memory.

BACKGROUND

A processor is a device that reads an instruction stored in an external storage device, analyzes the instruction to perform an arithmetic operation using an operand designated by the instruction, and again stores the instruction in the external storage device, thereby performing a specific function according to a stored program.

The processor is applied to various fields, and performs various and complicated functions. A function of the processor is being used in various application fields such as video encoding/decoding, audio encoding/decoding, network packet routing, system control, etc.

The processor is fundamentally configured with a core, a translation lookaside buffer (TLB), and a cache.

Work performed by the processor is defined as a combination of a plurality of instructions, which are stored in a memory. The instructions are sequentially input to the processor, which performs an arithmetic operation at every clock cycle.

The TLB is an element that converts a virtual address into a physical address, for driving an application based on an operating system (OS).

The cache is an element for enhancing a performance of a system. Also, the cache is a buffer type of high-speed memory unit that stores instructions or programs read from a main memory unit. The cache temporarily stores an instruction (which is stored in an external memory) in a chip, thereby increasing a speed of the processor.

The external memory stores a large-scale instruction of several Gbytes or more (256 Gbytes or more), but a memory implemented in a chip has a capacity of several Mbytes. The cache is an element in which an external large-capacity memory is temporarily equipped in a chip.

The core expends much time of 10 to 100 cycles for reading data from the external memory, and for this reason, an idle state in which the core does not perform work is maintained for a long time.

The cache is an element that considerably affects a performance of the processor. When the core requires a specific instruction but the cache does not include the instruction required by the processor, the instruction should be read from the external memory, and thus, the cache is in the idle state while the instruction is being the external memory, and the processor transfers an address to the cache upon each request. Also, the cache stores a corresponding address (i.e., a tag) as an index for an internally stored instruction code in a tag memory, and whenever the processor requests an instruction code, the cache accesses the tag memory comparing an address and a tag.

In this case, the cache stores a tag corresponding to the stored instruction code. However, when the processor performs a write operation on a tag stored in another cache, the processor reads a write value from a corresponding tag in the other cache. Therefore, when a plurality of the processors are integrated, a tag is stored in a cache memory for each of the processors, and it is required to determine whether a corresponding tag is stored in another cache.

That is, when the plurality of processors are provided, it is required to secure coherency between a plurality of the caches.

SUMMARY

Accordingly, the present invention provides a cache control apparatus and method that realize coherency between caches by changing a cache structure and defining a dedicated communication channel.

In one general aspect, a cache control apparatus includes: a coherency controller client configured to include an MESI register that is included in an instruction cache, and stores at least one of a modified state, an exclusive state, a shared state, and an invalid state for each line of the instruction cache; and a coherency interface connected to the coherency controller, and configured to transmit and receive broadcast address information, read or write information, and hit or miss information of another cache to and from the instruction cache.

In another general aspect, a cache control method includes: performing a hit/miss receiving operation of receiving a hit signal or miss signal of an instruction cache from a tag memory controller; performing a transmission operation of transmitting broadcast address information, read or write information, and hit or miss information to another cache through a coherency interface, based on the received hit signal or miss signal; performing a reception operation of receiving the broadcast address information, read or write information, and hit or miss information of the other cache through the coherency interface; and performing a state modification and start instruction signal transmitting operation of analyzing the received broadcast address information, read or write information, and hit or miss information to modify state information of the instruction cache, and transmitting a read start instruction signal or a write start instruction signal.

Other features and aspects will be apparent from the following detailed description, the drawings, and the claims.

BRIEF DESCRIPTION OF THE DRAWINGS

FIG. 4 is a table showing an operation of the cache control apparatus according to the present invention.

DETAILED DESCRIPTION OF EMBODIMENTS

Hereinafter, embodiments of the present invention will be described in detail with reference to the accompanying drawings.

Figure 1:
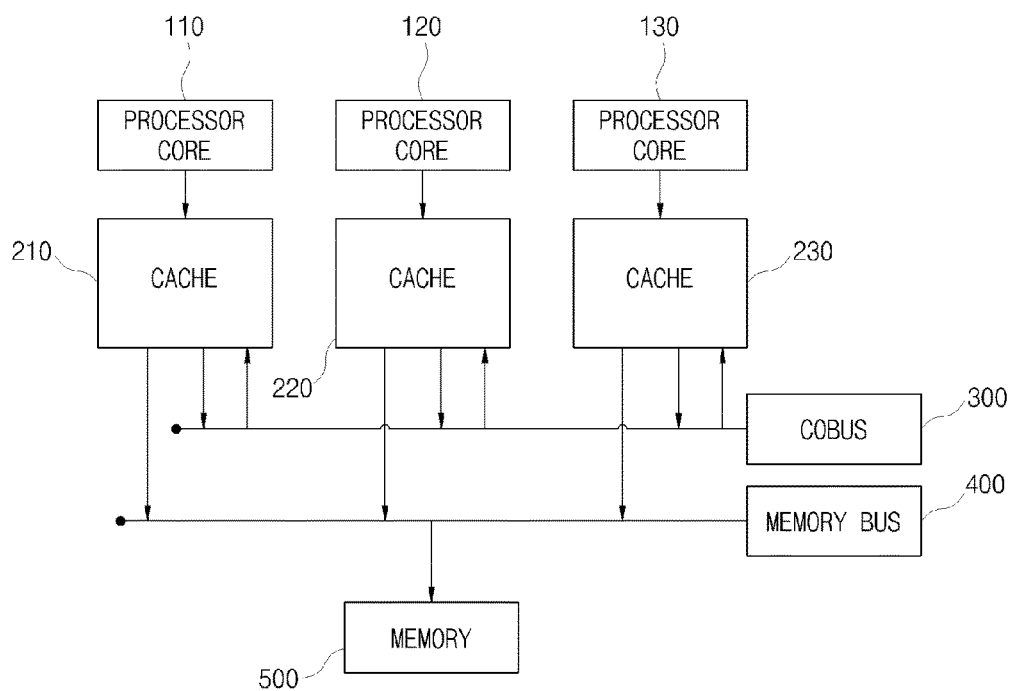
FIG. 1 is a block diagram illustrating a structure of a multi-processor using a cache control apparatus according to the present invention.

FIG. 1 is a block diagram illustrating a structure of a multi-processor using a cache control apparatus according to the present invention.

Each of a plurality of processor core 110, 120 and 130 is an element that reads an instruction and performs an arithmetic operation according to an algorithm. Each of the processor core 110, 120 and 130 may include one cache, and thus, since the plurality of processor core 110, 120 and 130 are provided, a plurality of caches 210, 220 and 230 are provided in proportion to the number of processors. Therefore, the cache control apparatus according to the present invention maintains coherency between the plurality of caches 210, 220 and 230.

When requesting an instruction code, a processor transmits an address to a cache. The cache stores a corresponding address (i.e., a tag) as an index for an internally stored instruction code in a tag memory, and whenever the processor requests the instruction code, the cache accesses the tag memory comparing an address and a tag.

In this case, when the processor performs a write operation on a tag stored in another cache, the processor reads a write value from a corresponding tag in the other cache. Therefore, when a plurality of processors are integrated, a tag is stored in a cache memory for each of the processors, and it is required to determine whether a corresponding tag is stored in another cache, thereby maintaining coherency between caches.

Figure 2:
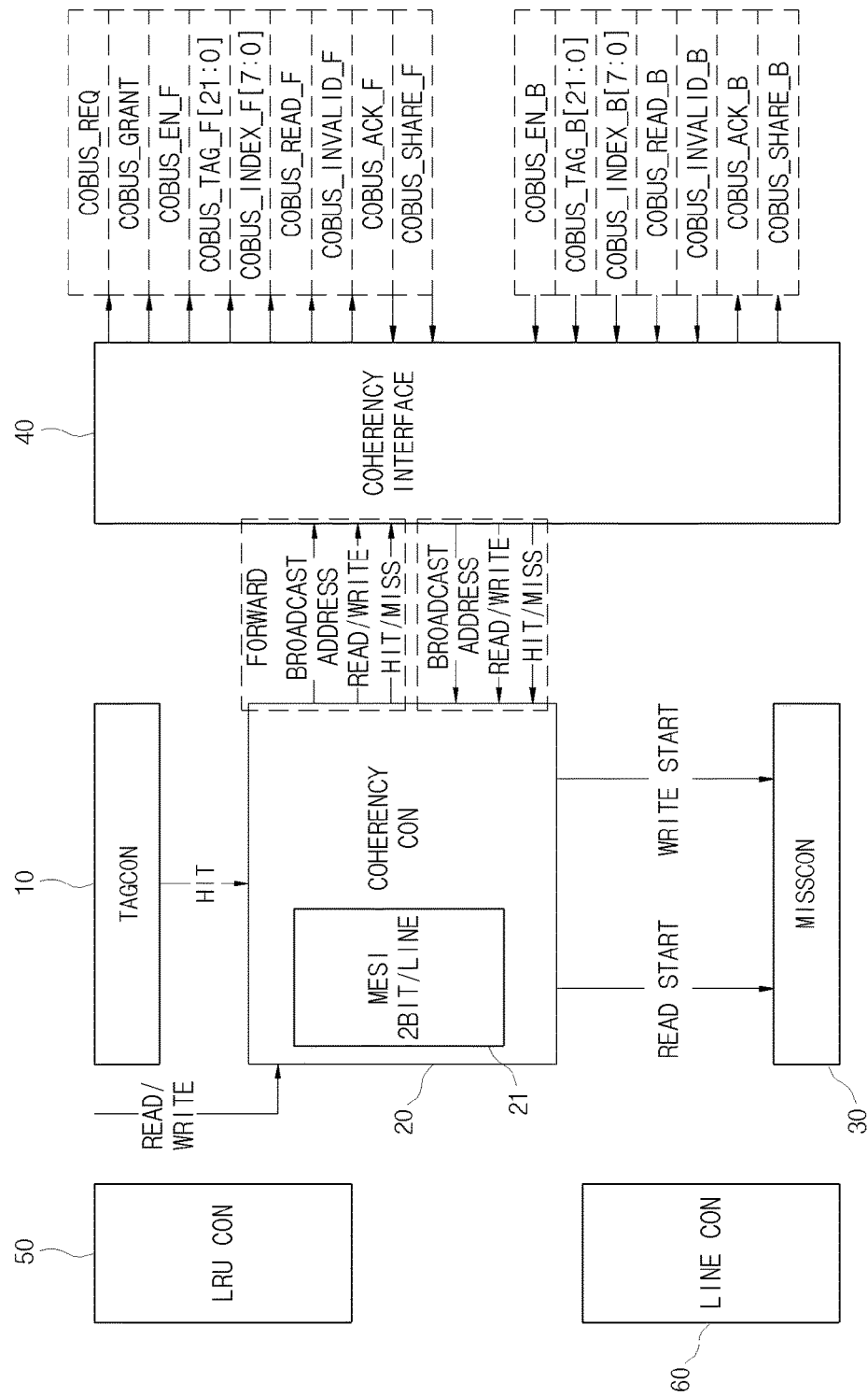
FIG. 2 is a block diagram for describing operations of a tag memory controller, a coherency controller, a coherency interface, and a miss controller which are included in the cache control apparatus according to the present invention.
Figure 3:
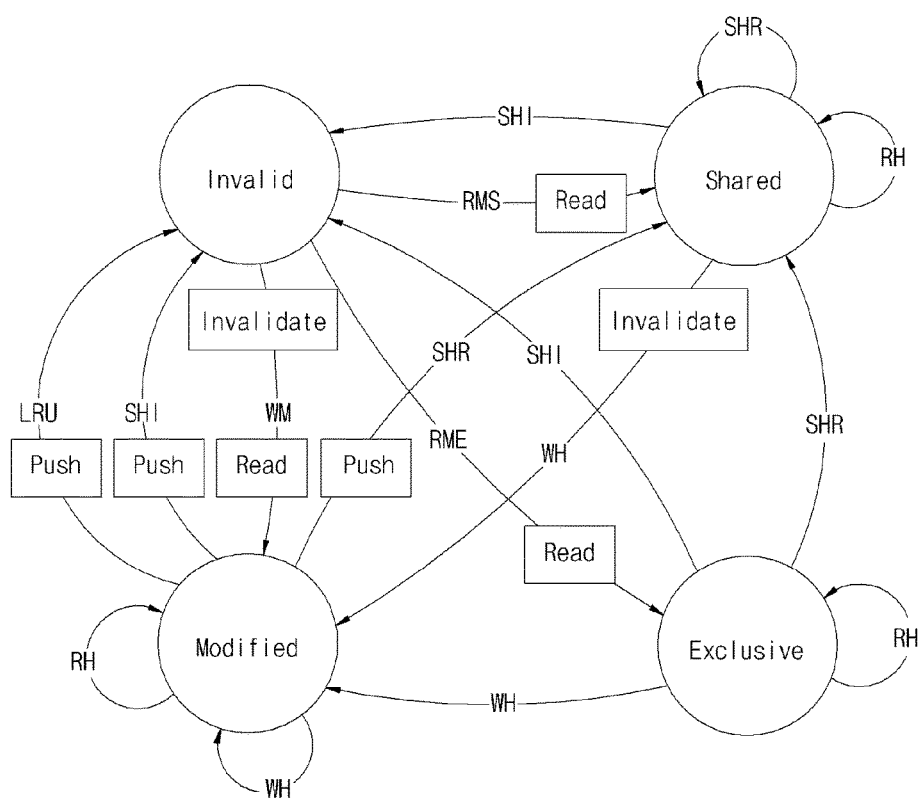
FIG. 3 is a diagram illustrating an MESI state for coherency between caches in the cache control apparatus according to the present invention.

FIG. 2 is a block diagram for describing operations of a tag memory controller, a coherency controller 20, a coherency interface 40, and a miss controller 30 which are included in the cache control apparatus according to the present invention. FIG. 3 is a diagram illustrating an MESI state for coherency between caches in the cache control apparatus according to the present invention. FIG. 4 is a table showing an operation of the cache control apparatus according to the present invention.

Referring to FIG. 2, the cache control apparatus according to the present invention includes the coherency controller 20 and the coherency interface 40. The coherency controller 20 includes an MESI register that is included in an instruction cache, and stores at least one of a modified state, an exclusive state, a shared state, and an invalid state for each line of the instruction cache. The coherency interface 40 is connected to the coherency controller 20, and transmits and receives broadcast address information, read/write information, and hit/miss information of another cache to and from the instruction cache.

The modified state is a state in which a corresponding tag is read from a memory, and is modified into a new value by a processor. The exclusive state is a state in which when reading a corresponding tag, another cache is searched, but the corresponding tag is included in the other cache as the search result. The shared state is a state in which when reading a corresponding tag, the corresponding tag is included in another cache, but is not modified into a new value by the processor. The invalid state is a state in which since a corresponding tag is invalid, it is required to again read data from the memory when there is a request of the processor.

When communication between caches is performed by using the four states, coherency between the caches is maintained. To this end, a cache of the cache control apparatus according to the present invention includes the coherency interface 40 for maintaining coherency between the caches, in addition to a communication interface between a processor and a memory.

Referring to FIG. 2, cobus_req is a coherency bus request signal, and cobus_grant is a signal for allowing an occupation of a coherency bus. cobus_en_f is a signal for enabling cobus_tag_f, cobus_index_f, cobus_write_f, and cobus_hit_f. cobus_tag_f[21:0] and cobus_index_f [7:0] are tag information and index information about an address for which read and write are requested by a processor, respectively. cobus_read_f is a signal indicating that a miss occurs when the processor cache-reads a broadcasted address, and cobus_invalid_f is a signal indicating that the processor has performed a cache write operation on the broadcasted address. cobus_ack_f is a signal indicating that another cache receives the signals "cobus_tag_f, cobus_index_f, cobus_write_f, and cobus_hit_f" and completes a processing operation for the received signals. cobus_share_f is a signal indicating that cobus_read_f is received, the inside of a cache is checked, and a cache is checked as including data of the broadcasted address. Each of cobus_en_b, cobus_tag_b[21:0], cobus_index_b[7:0], cobus_read_b, cobus_invalid_b, cobus_ack_b, and cobus_share_b is a signal that is transferred to the other cache as a forward type signal, and uses a _b (backward) signal instead of a name of a _f signal.

Moreover, the cache control apparatus according to the present invention further includes a miss controller 30 that receives a read start instruction signal or a write start instruction signal from the coherency controller 20.

The coherency controller 20 analyzes the broadcast address information, read/write information, and hit/miss information of the other cache which are received from the coherency interface 40, and transmits the read start instruction signal or the write start instruction signal to the miss controller 30 on the basis of the analysis result.

The coherency controller 20 includes a 2-bit MESI state register 21 for each line so as to store the modified state, the exclusive state, the shared state, and the invalid state for each cache line. The coherency controller 20 receives the hit/miss information determined by the memory controller 10, and transmits broadcast address information, read/write information, and hit/miss information, which is to be transmitted to another cache, to the coherency interface 40 on the basis of the received hit/miss information. The coherency controller 20 receives the broadcast address information, read/write information, and hit/miss information from the other cache, and analyzes the received information. The coherency controller 20 transmits the read start instruction signal or the write start instruction signal to the miss controller 30 in order for the miss controller 30 to transmit the read start instruction signal or the write start instruction signal to a synchronous dynamic random access memory (SDRAM).

When the instruction cache is in the invalid state because the instruction cache is empty and a read miss signal "RM event" is received from the tag memory controller 10, the coherency controller 20 transmits broadcast address information and read miss information of the instruction cache through the coherency interface 40.

When state information of the other cache which is received through the coherency interface 40 indicates the shared state (cobus_shared_f=1), the coherency controller 20 modifies the invalid state of the instruction cache into the shared state, transmits the read start instruction signal to the miss controller 30.

Referring to FIG. 3, a state in which a read miss occurs in the invalid state and shared state information is received from the other cache is illustrated as RMS. A cache line is read from a memory, and a bus transaction for reading the cache line from the memory is illustrated as Read.

On the other hand, when state information of the other cache which is received through the coherency interface 40 indicates the exclusive state (cobus_shared_f=0), the coherency controller 20 modifies the invalid state of the instruction cache into the exclusive state, transmits the read start instruction signal to the miss controller 30, and reads the cache line from the memory.

In FIG. 3, a state in which the read miss occurs in the invalid state and exclusive state information is received from the other cache is illustrated as RME. The cache line is read from a memory, and a bus transaction for reading the cache line from the memory is illustrated as Read.

When the instruction cache is in the invalid state and a write miss signal "WM event" is received from the tag memory controller 10, the coherency controller 20 transmits an invalidation signal through the coherency interface 40 (cobus_invalid_f=1), receives a backward response signal for the transmitted invalidation signal (cobus_ack_b=1), transmits the read start instruction signal to the miss controller 30, and modifies the invalid state into the modified state.

The instruction cache continuously maintains the invalid state in a case (cobus_read_b=1) of a snoop hit on read "SHR event" or a case (cobus_read_b=1) of a snoop hit on invalidate event "SHI event".

When the instruction cache is in the shared state and a write hit signal is received from the tag memory controller 10 (WH event), the coherency controller 20 transmits the invalidation signal through the coherency interface 40 (cobus_invalid_f=1), receives the backward response signal for the invalidation signal (cobus_ack_b=1), transmits the read start instruction signal to the miss controller 30 to read the cache line from the memory, and modifies the shared state into the modified state.

In this case, when the coherency interface 40 receives cobus_invalid_b as 1 (the snoop hit on invalidate (SHI) event), the shared state is modified into the invalid state, and when a read hit (RH) event or the snoop hit on read (SHR) event occurs, the shared state is maintained.

Moreover, when the instruction cache is in the modified state and the coherency controller 20 receives the signal "cobus_read_b" as 1 through the coherency interface 40 (the SHR event), the coherency controller 20 transmits the write start instruction signal to the miss controller 30 to write information of the cache line in the memory, and modifies the modified state into the shared state.

On the other hand, when the instruction cache is in the modified state and the coherency controller 20 receives the signal "cobus_invalid_b" as 1 (the SHI event), the coherency controller 20 transmits the write start instruction signal to the miss controller 30 to write the information of the cache line in the memory, and modifies the modified state into the shared state.

When it is required to empty a line by using a least recently used (LRU) controller 50, the coherency controller 20 writes the information of the cache line in the memory, and the coherency controller 20 modifies a state of the instruction cache into the invalid state.

When the read hit signal or the write hit signal is received from the tag memory controller 10 (when the RH event or the WH event occurs), the coherency controller 20 maintains the modified state.

When the instruction cache is in the exclusive state and read hit information is received from the tag memory controller 10 (the RH event), the coherency controller 20 maintains the exclusive state, and when write hit information is received from the tag memory controller 10 (the WH event), the coherency controller 20 modifies the state of the instruction cache into the modified state.

When the instruction cache is in the exclusive state and snoop invalidation hit information is received through the coherency interface 40 (the SHI event), the coherency controller 20 modifies the exclusive state into the invalid state, and when snoop read hit information is received through the coherency interface 40 (the SHR event), the coherency controller 20 modifies the exclusive state into the shared state.

Figure 5:
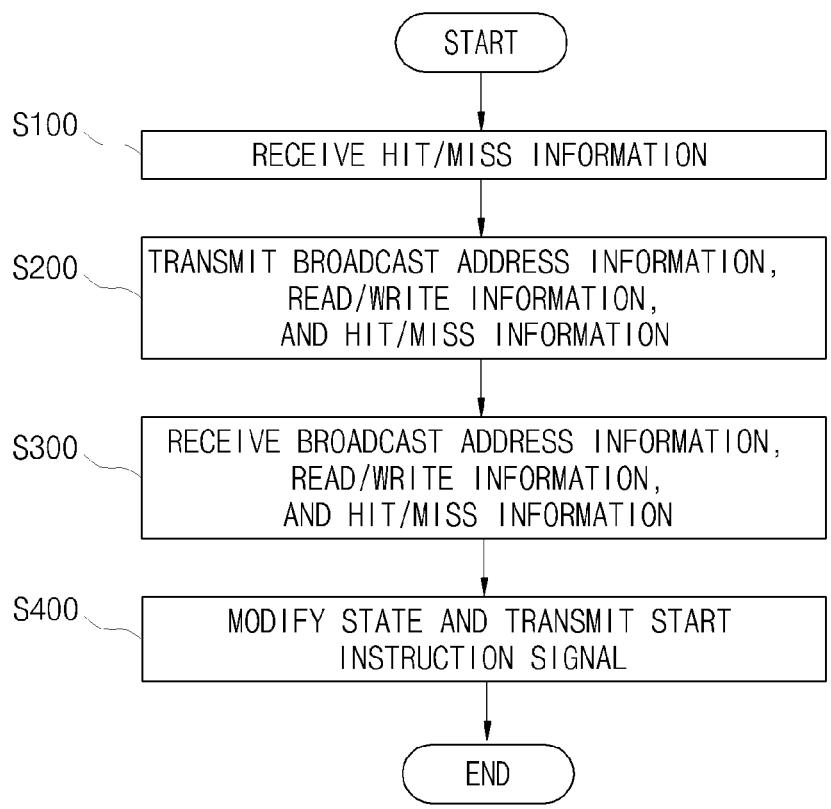
FIG. 5 is a flowchart illustrating a cache control method according to the present invention.

FIG. 5 is a flowchart illustrating a cache control method according to the present invention.

Referring to FIG. 5, the cache control method according to the present invention includes: a hit/miss receiving operation S100 that receives the hit signal or miss signal of the instruction cache from the tag memory controller; a transmission operation S200 that transmits broadcast address information, read/write information, and hit/miss information to another cache through the coherency interface on the basis of the received hit signal or miss signal; a reception operation S300 that receives the broadcast address information, read/write information, and hit/miss information of the other cache through the coherency interface; and a state modification and start instruction signal transmitting operation S400 that analyzes the received broadcast address information, read/write information, and hit/miss information to modify state information of the instruction cache, and transmits the read start instruction signal or the write start instruction signal.

When the instruction cache is in the invalid state, the read miss signal is received (the RM event) in the hit/miss receiving operation S100, and shared state information is received in the reception operation S300, the state modification and start instruction signal transmitting operation S400 modifies the invalid state into the shared state, and transmits the read start instruction signal.

On the other hand, when the instruction cache is in the invalid state, the read miss signal is received (the RM event) in the hit/miss receiving operation S100, and exclusive state information is received in the reception operation S300, the state modification and start instruction signal transmitting operation S400 modifies the invalid state into the exclusive state, and transmits the read start instruction signal.

Moreover, when the instruction cache is in the invalid state, the write miss signal is received (the WM event) in the hit/miss receiving operation S100, the invalidation signal "cobus_invalid_f=1" is transmitted, and the backward response signal "cobus_ack_b=1" for the invalidation signal is received, the state modification and start instruction signal transmitting operation S400 transmits the read start instruction signal, and modifies the invalid state into the modified state.

Moreover, when the instruction cache is in the shared state, the write hit signal is received (the WH event) in the hit/miss receiving operation S100, the invalidation signal "cobus_invalid_f=1" is transmitted, and the backward response signal "cobus_ack_b=1" for the invalidation signal is received, the state modification and start instruction signal transmitting operation S400 transmits the read start instruction signal, and modifies the shared state into the modified state.

At this time, when the read hit signal or the snoop read hit signal is received (the RH event or the SHR event) in the hit/miss receiving operation S100 or the reception operation S300, the state modification and start instruction signal transmitting operation S400 maintains the shared state.

Moreover, when the instruction cache is in the modified state and the snoop read hit signal is received (the SHR event) in the reception operation S300, the state modification and start instruction signal transmitting operation S400 transmits the write start instruction signal, and modifies the modified state into the shared state.

On the other hand, when the instruction cache is in the modified state and the snoop invalidation hit signal is received (the SHI event) in the reception operation S300, the state modification and start instruction signal transmitting operation S400 transmits the write start instruction signal, and modifies the modified state into the invalid state.

At this time, when read hit information or write hit information is received (the RH event or the WH event) in the hit/miss receiving operation S100, the state modification and start instruction signal transmitting operation S400 maintains the modified state.

Moreover, the instruction cache is in the exclusive state. In this case, when the read hit signal is received (the RH event) in the hit/miss receiving operation S100, the state modification and start instruction signal transmitting operation S400 maintains the exclusive state. When the write hit signal is received (the WH event) in the hit/miss receiving operation S100, the state modification and start instruction signal transmitting operation S400 modifies the exclusive state of the instruction cache into the modified state. When the snoop invalidation hit signal is received (the SHI event) in the reception operation S300, the state modification and start instruction signal transmitting operation S400 modifies the exclusive state into the invalid state. When the snoop read hit signal is received (the SHR event) in the reception operation S300, the state modification and start instruction signal transmitting operation S400 modifies the exclusive state into the shared state.

As described above, in the cache control apparatus and method according to the present invention, the interface for coherency between caches is provided, and thus, in a case where a plurality of processors are applied to a chip, the tag memory is accessed for comparing an address and a tag when a processor requests an instruction code, and whether a corresponding tag is stored in another cache is determined, thereby maintaining coherency between caches. Accordingly, the present invention solves incoherency of data and an instruction, generated by the cache memory, in a cache.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Figure 6:
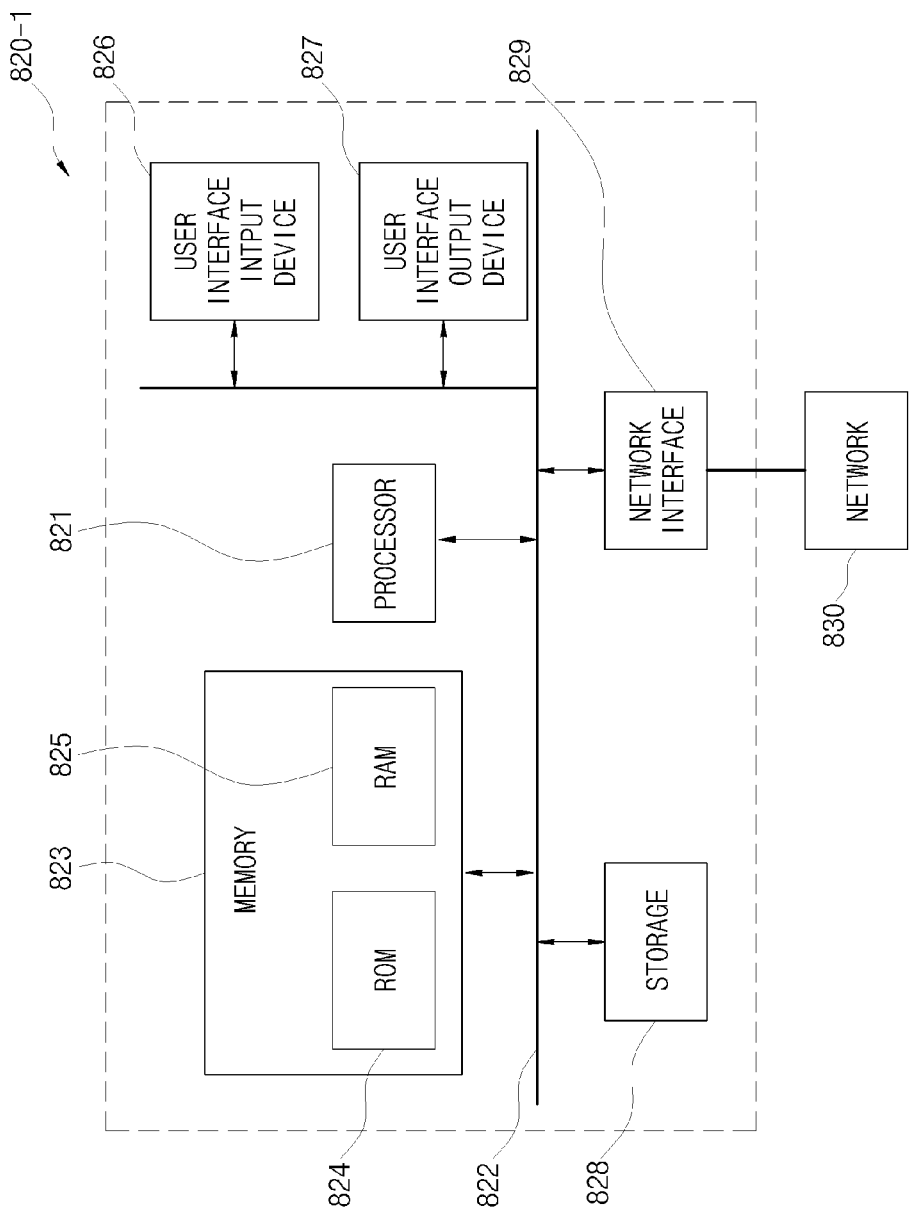
FIG. 6 is an exemplary diagram of a computer system implementing an embodiment of the present invention.

An embodiment of the present invention may be implemented in a computer system, e.g., as a computer readable medium. As shown in FIG. 6, a computer system 820-1 may include one or more of a processor 821, a memory 823, a user input device 826, a user output device 827, and a storage 828, each of which communicates through a bus 822. The computer system 820-1 may also include a network interface 829 that is coupled to a network. The processor 821 may be a central processing unit (CPU) or a semiconductor device that executes processing instructions stored in the memory 823 and/or the storage 828. The memory 823 and the storage 828 may include various forms of volatile or non-volatile storage media. For example, the memory may include a read-only memory (ROM) 824 and a random access memory (RAM) 825.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

What is claimed is:

1. A cache control apparatus for one of a plurality of caches, respectively used by one of a plurality of processors for accessing a memory, for maintaining data coherency of the plurality of caches, each cache including an instruction cache and a tag memory, the apparatus comprising:
    a coherency controller including an MESI (modified exclusive shared invalid) register that is included in the instruction cache of the one cache, and is configured to store one of a modified state, an exclusive state, a shared state, and an invalid state for each cache line of the instruction cache;
    a coherency interface connected to the coherency controller, and configured to transmit and receive broadcast address information including a broadcasted address for a cache read or write operation, an index address that corresponds to the broadcast address and that indicates a location in the tag memory for internally storing the cache read or write operation, read or write information, and hit or miss information of another one of the plurality of caches to and from the instruction cache, wherein
    the coherency controller is configured to,
        upon detecting that a cache line of the instruction cache is in the modified state and is required to be emptied by using a least recently used (LRU) controller, write information in the cache line to the memory,
        modify the modified state of the cache line to the invalid state, and
        transmit a signal for requesting access to a coherency bus and a signal for allowing an occupation of the coherency bus.

2. The cache control apparatus of claim 1, further comprising a miss controller configured to receive one of a read start instruction signal or a write start instruction signal from the coherency controller.

3. The cache control apparatus of claim 2, wherein the coherency controller
    analyzes a plurality of pieces of information including the broadcast address information, the index address, the read or write information, and the hit or miss information of the another cache, each piece of information being received from the coherency interface, and
    transmits the read start instruction signal or the write start instruction signal to the miss controller, based on a result of the analysis.

4. The cache control apparatus of claim 3, wherein,
    when the instruction cache is in the invalid state and a read miss signal is received from a tag memory controller, the coherency controller transmits the broadcast address information, the index address, the read or write information, and the hit or miss information of the instruction cache to the another cache through the coherency interface, when state information of the another cache which is received through the coherency interface indicates the shared state, the coherency controller modifies the invalid state of the instruction cache into the shared state, transmits the read start instruction signal to the miss controller, and reads a cache line from the memory, and when the state information of the another cache which is received through the coherency interface indicates the exclusive state, the coherency controller modifies the invalid state of the instruction cache into the exclusive state, transmits the read start instruction signal to the miss controller, and reads the cache line from the memory.

5. The cache control apparatus of claim 3, wherein when the instruction cache is in the invalid state and a write miss signal is received from a tag memory controller, the coherency controller transmits an invalidation signal through the coherency interface, receives a backward response signal for the transmitted invalidation signal, transmits the read start instruction signal to the miss controller, and modifies the invalid state into the modified state.

6. The cache control apparatus of claim 3, wherein when the instruction cache is in the shared state and a write hit signal is received from a tag memory controller, the coherency controller transmits an invalidation signal through the coherency interface, receives a backward response signal for the transmitted invalidation signal, transmits the read start instruction signal to the miss controller to read a cache line from the memory, and modifies the shared state into the modified state.

7. The cache control apparatus of claim 6, wherein when a read hit signal or a snoop read hit signal is received, the coherency controller maintains the shared state.

8. The cache control apparatus of claim 3, wherein, when the instruction cache is in the modified state and a snoop read hit signal is received, the coherency controller transmits the write start instruction signal to the miss controller to write information of a cache line in the memory, and modifies the modified state into the shared state, and when the instruction cache is in the modified state and a snoop invalidation hit signal is received, the coherency controller transmits the write start instruction signal to the miss controller to write the information of the cache line in the memory, and modifies the modified state into the invalid state.

9. The cache control apparatus of claim 8, wherein when a read hit signal or a write hit signal is received from a tag memory controller, the coherency controller maintains the modified state.

10. The cache control apparatus of claim 3, wherein, in a case where the instruction cache is in the exclusive state, when read hit information is received from a tag memory controller, the coherency controller maintains the exclusive state, when write hit information is received from the tag memory controller, the coherency controller modifies the exclusive state of the instruction cache into the modified state, when snoop invalidation hit information is received through the coherency interface, the coherency controller modifies the exclusive state into the invalid state, and when snoop read hit information is received through the coherency interface, the coherency controller modifies the exclusive state into the shared state.

11. A cache control method of a cache control apparatus including a cache controller for one of a plurality of caches, respectively used by one of a plurality of processors for accessing a memory, for maintaining data coherency of the plurality of caches, each cache including an instruction cache and a tag memory, the method comprising:

performing a hit/miss receiving operation of receiving a hit signal or a miss signal of the instruction cache of the one cache from a tag memory controller;

performing a transmission operation of transmitting broadcast address information including a broadcasted address for a cache read or write operation, an index address that corresponds to the broadcast address and that indicates a location in the tag memory for internally storing the cache read or write operation, read or write information, and hit or miss information to another one of the plurality of caches through a coherency interface by requesting a coherency bus as a dedicated communication channel for maintaining the data coherency of the plurality of caches, based on the received hit signal or miss signal;

performing a reception operation of receiving the broadcast address information, the index address, the read or write information, and the hit or miss information of the another cache through the coherency interface; and performing a state modification and start instruction signal transmitting operation of analyzing the received broadcast address information, index address, read or write information, and hit or miss information to modify state information of the instruction cache, and transmitting a read start instruction signal or a write start instruction signal, wherein the state modification and start instruction signal transmitting operation includes, upon detecting that a cache line of the instruction cache is in the modified state and is required to be emptied by using a least recently used controller, writing information of the cache line to the memory, and modifying the modified state of the cache line to the invalid state.

12. The cache control method of claim 11, wherein the state modification and start instruction signal transmitting operation comprises:

when the instruction cache is in the invalid state, and a read miss signal is received in the hit/miss receiving operation, when shared state information is received in the reception operation, modifying the invalid state into the shared state, and transmitting the read start instruction signal; and when exclusive state information is received in the reception operation, modifying the invalid state into the exclusive state, and transmitting the read start instruction signal.

13. The cache control method of claim 11, wherein the state modification and start instruction signal transmitting operation comprises, when the instruction cache is in the invalid state, a write miss signal is received in the hit/miss receiving operation, an invalidation signal is transmitted, and a backward response signal for the invalidation signal is received, transmitting the read start instruction signal, and modifying the invalid state into the modified state.

14. The cache control method of claim 11, wherein the state modification and start instruction signal transmitting operation comprises, when the instruction cache is in the shared state, a write hit signal is received in the hit/miss receiving operation, an invalidation signal is transmitted, and a backward response signal for the invalidation signal is received, transmitting the read start instruction signal, and modifying the shared state into the modified state.

15. The cache control method of claim 14, wherein the state modification and start instruction signal transmitting operation comprises, when a read hit signal or a snoop read hit signal is received in the hit/miss receiving operation or the reception operation, maintaining the shared state.

16. The cache control method of claim 11, wherein the state modification and start instruction signal transmitting operation comprises:
when the instruction cache is in the modified state and a snoop read hit signal is received in the reception operation, transmitting the write start instruction signal, and modifying the modified state into the shared state; and
when the instruction cache is in the modified state and a snoop invalidation hit signal is received in the reception operation, transmitting the write start instruction signal, and modifying the modified state into the invalid state.

17. The cache control method of claim 16, wherein the state modification and start instruction signal transmitting operation comprises, when read hit information or write hit information is received in the hit/miss receiving operation, maintaining the modified state.

18. The cache control method of claim 11, wherein the state modification and start instruction signal transmitting operation comprises: when the instruction cache is in the exclusive state,
when a read hit signal is received in the hit/miss receiving operation, maintaining the exclusive state;
when a write hit signal is received in the hit/miss receiving operation, modifying the exclusive state of the instruction cache into the modified state;
when a snoop invalidation hit signal is received in the reception operation, modifying the exclusive state into the invalid state; and
when a snoop read hit signal is received in the reception operation, modifying the exclusive state into the shared state.

* * * * *